No. 740,822. PATENTED OCT. 6, 1903.
J. A. DICKEY.
REVERSIBLE TRANSMISSION GEAR.
APPLICATION FILED OCT. 31, 1902.
NO MODEL. 2 SHEETS—SHEET 1.
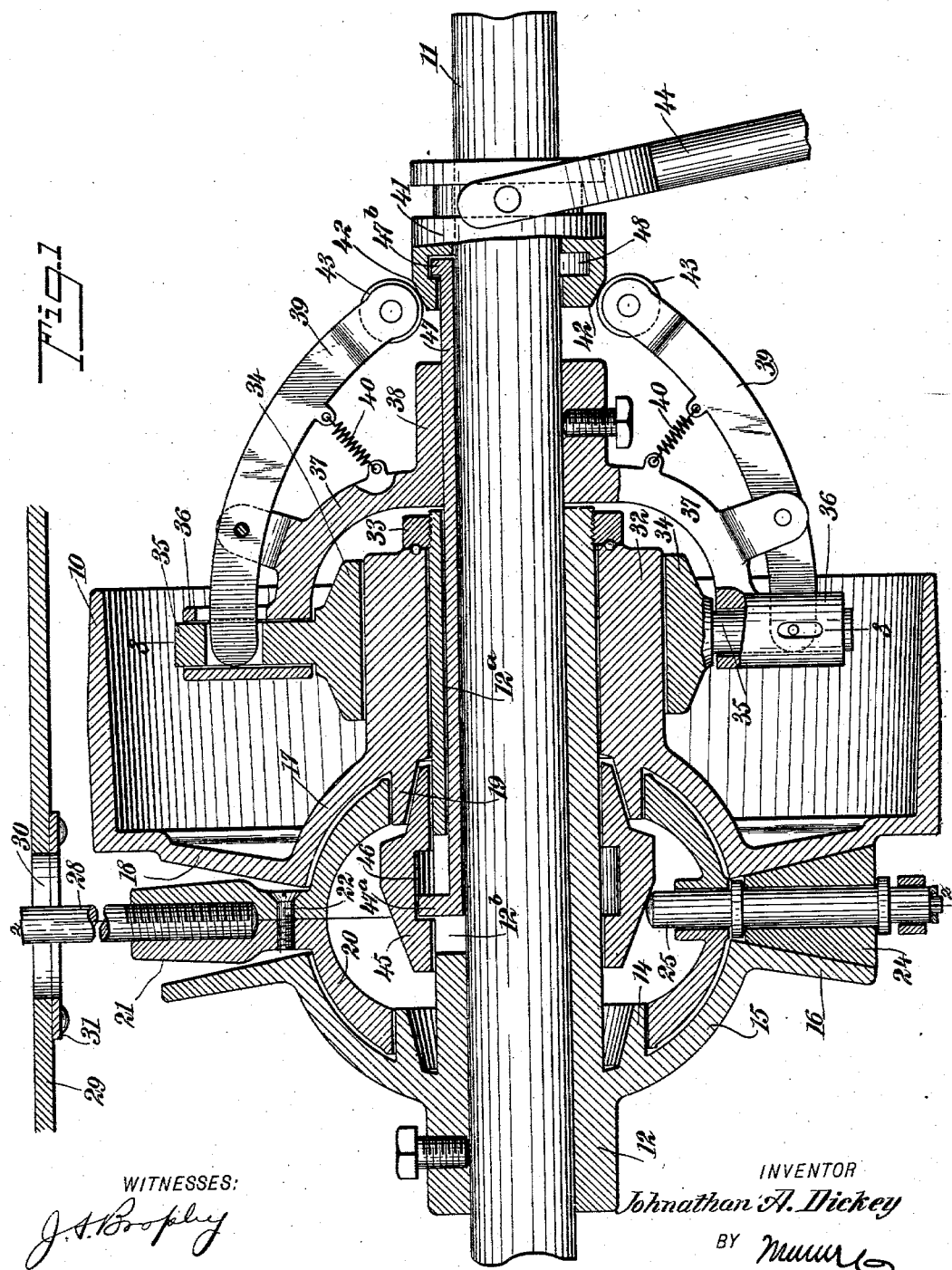
WITNESSES:
J. A. Brophy
Isaac B. Owens.
INVENTOR
Johnathan A. Dickey
BY
ATTORNEYS.

No. 740,822. PATENTED OCT. 6, 1903.
J. A. DICKEY.
REVERSIBLE TRANSMISSION GEAR.
APPLICATION FILED OCT. 31, 1902.
NO MODEL. 2 SHEETS—SHEET 2.
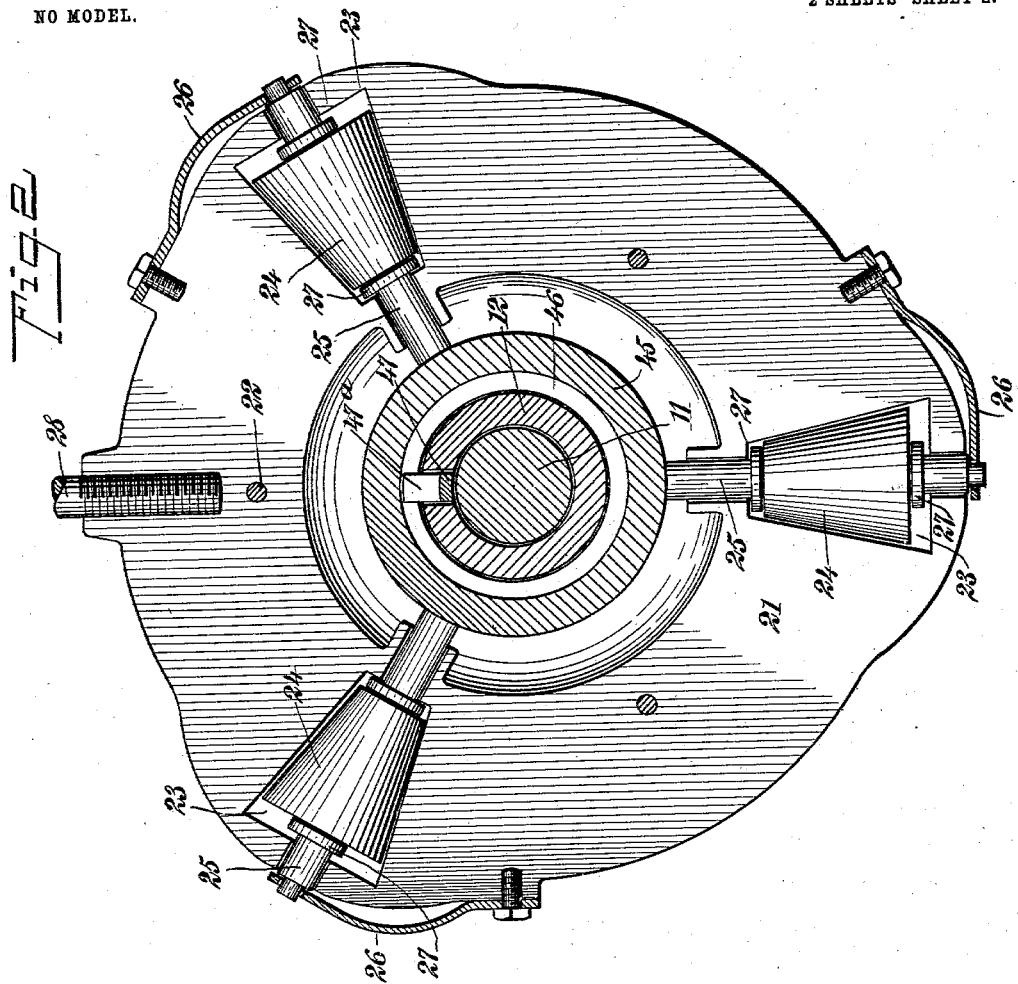
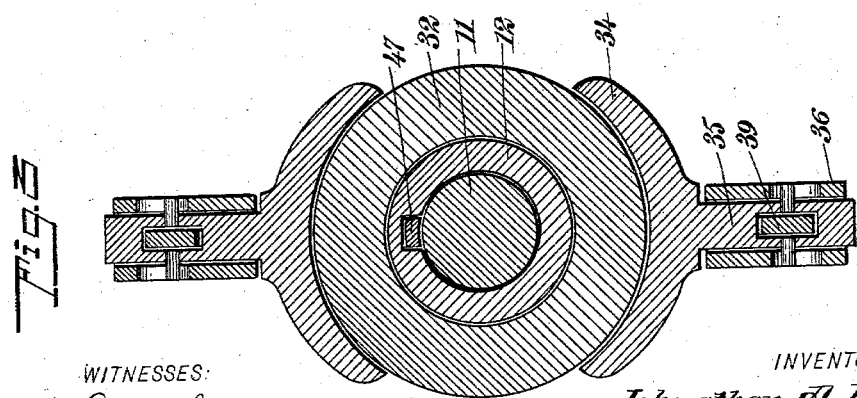
WITNESSES:
J. A. Brophy
Isaac B. Owens.
INVENTOR
Johnathan A. Dickey
BY
ATTORNEYS.

No. 740,822.

Patented October 6, 1903.

UNITED STATES PATENT OFFICE.

JOHNATHAN A. DICKEY, OF COLUMBUS, INDIANA, ASSIGNOR OF ONE-HALF TO DAVID B. SNYDER, OF COLUMBUS, INDIANA.

REVERSIBLE TRANSMISSION-GEAR.

SPECIFICATION forming part of Letters Patent No. 740,822, dated October 6, 1903.

Application filed October 31, 1902. Serial No. 129,554. (No model.)

*To all whom it may concern:*

Be it known that I, JOHNATHAN A. DICKEY, a citizen of the United States, and a resident of Columbus, in the county of Bartholomew and State of Indiana, have invented a new and Improved Reversible Transmission-Gear, of which the following is a full, clear, and exact description.

This invention relates to a mechanism for transmitting movement either backward or forward, as may be desired. The apparatus is fitted with a clutch for directly connecting the driving and driven elements and a set of gears for connecting said elements to run the driven element in the opposite direction, the clutch and gears being arranged the one to be inactive upon the action of the other, and vice versa.

The invention is useful in many diverse arts, as will be obvious to skilled mechanics, but has been especially designed for driving lathes, in which work it is necessary to reverse the counter-shaft for screw-cutting and other purposes. When so applied, the invention avoids the use of the well-known open and cross belts usually employed.

The invention resides in certain new combinations and features of construction, which will hereinafter be set forth at length.

This specification is an exact description of one example of my invention, while the claims define the actual scope thereof.

Reference is to be had to the accompanying drawings, forming a part of this specification, in which similar characters of reference indicate corresponding parts in all the views.

Figure 1 is a longitudinal section of the invention. Fig. 2 is a sectional elevation on the line 2 2 of Fig. 1, and Fig. 3 is a cross-section on the line 3 3 of Fig. 1.

10 indicates the face of the pulley, which may be taken as the driving element of the gear, and 11 indicates the shaft, which may be taken as the driven element of the gear. Suitably fastened to the shaft 11 is a sleeve 12. On this sleeve is formed an inwardly-projecting ledge 14, concentric to the shaft 11, for a purpose which will be hereinafter fully set forth, and projecting out from said sleeve at the flange 14 is a web 15, which carries a friction or other gear 16, concentric to the shaft 11.

17 indicates the web of the pulley, and on this web is formed a friction or other gear 18, lying opposite the gear 16 and of a diameter equal to that of said gear 16. The web 17 of the pulley also has a ledge 19, this ledge corresponding with and lying opposite the ledge 14. Said ledges 14 and 19 carry the hub 20 of a carrier-disk 21. This carrier-disk is for convenience of manufacture constructed in two sections, as indicated, fastened together by screws or other devices 22. The carrier 21 has a number of cavities 23 formed therein, and in these cavities are located the bevel-gears 24. These gears are friction-gears to suit the gears 16 and 18, and, as here shown, they are three in number. Each gear 24 is fastened on a radially-disposed shaft 25, said shafts being fitted axially movable in the carrier 21, their inner ends projecting into the hollow hub 20, and their outer ends projecting beyond the carrier and being connected to springs 26, fastened to the periphery of the carrier, said springs tending to push the shafts 25 inward, and through the medium of the collars 27 on said shafts to hold the gears 24 in mesh with the gears 16 and 18. An arm 28 projects from the carrier 21, and this arm is adapted to be engaged with any suitable member 29, supported stationary independently of the pulley. Said member 29 is formed with a slot 30, receiving the arm, and 31 indicates a face-plate which is fastened to the member 29 and orificed to match the slot 30. This slotted arrangement allows movement of the arm 28 longitudinally on the shaft to enable the pulley-face 10 to be properly adjusted, but it prevents any rotary movement of the carrier, the ledges 14 and 19 running loosely in and sustaining the carrier.

The hub 32 of the pulley is mounted loosely on the sleeve 12, and 33 indicates a collar which is fastened to the right-hand end of the sleeve to hold the hub 32 in place. Working with the hub 32 of the pulley are the shoes 34 of the clutch. These shoes have shanks 35 radially slidable in tubular holders 36, said holders being formed on arms 37, projecting outward and then inward from a collar 38, fastened securely to the shaft 11. On said arms 37 are fulcrumed levers 39, which have suitable connection with the shanks 35 of the shoes 34. Springs 40 are provided to hold the levers 39 inward at their outer ends, thus keeping the shoes 34 normally disengaged from the hub 32.

41 indicates the clutch-collar which is loose on the shaft 11 and has a tapered portion 42 engaging rollers 43 on the outer ends of the levers 39. The collar 41 is engaged with a forked lever 44 in the usual manner, and by this means the collar is moved on the shaft toward and from the pulley, and when the collar is moved to the left from the position shown in Fig. 1 the clutch-shoes 34 are applied to the hub 32. The sleeve 12 is formed with a longitudinal groove $12^a$ therein running from its left-hand end to a point opposite the hub 20 of the carrier 21, and at this point the groove $12^a$ communicates by an opening $12^b$ with the interior of said hub 20. Mounted loosely on the sleeve 12 inside of this hub 20 is a tapered collar 45, and engaging with the walls of a cavity or interior annular groove 46 in said collar is the outwardly-bent end $47^a$ of a rod 47, which runs loosely through the groove $12^a$ and extends to the right to the collar 41, where it is formed with an outwardly-turned end $47^b$, lying loosely in an interior annular groove 48 in the collar 41. Therefore when the collar 41 is shifted the rod 47 is moved correspondingly, and through the medium of the part $47^a$ the collar 45 is shifted from the inactive position (shown in Fig. 1) to the active position to the right of that illustrated.

Fig. 1 shows the parts as adjusted for driving the shaft 11 from the pulley 10 through the medium of the gears 18, 24, and 16, and in this view it will be observed that the collar 41 is moved to the rightward, and the springs 26 are therefore allowed to push inward the gears 24, engaging them with the gears 18 and 16. The rotary movement of the gear 18 drives the gears 24, and these in turn drive the shaft 11. To reverse the movement of the shaft 11, the clutch-collar 41 should be moved inward. This causes the tapered collar 45 to be moved to the left, and through the medium of the shafts 25 the gears 24 are disengaged from the gears 18 and 16. Simultaneously the shoes 34 are engaged with the hub 32 of the pulley, and the shaft is therefore directly connected with the pulley and is driven in the reverse direction to that imparted under the action of the gears.

It will be observed that the counterbore 46 is sufficiently wide to allow the taper collar 41 to be moved to the right, (see Fig. 1,) thus disengaging the clutch without allowing the gears 24 to move into mesh with the gears 16 and 18. This renders the pulley loose on the shaft, and no movement is transmitted in either direction.

Various changes in the form, proportions, and minor details of my invention may be resorted to at will without departing from the spirit and scope thereof. Hence I consider myself entitled to all such variations as may lie within the intent of my claims.

Having thus described my invention, I claim as new and desire to secure by Letters Patent—

1. In a reversible transmission-gear the combination of a shaft, a pulley loose with respect thereto and having a gear fast thereon, a clutch for connecting the pulley and shaft, a second gear fast to the shaft, a third gear movable into and out of mesh with the two gears first named, means extending directly through the transmission-gear for alternately acting on the clutch and said third gear, for the purpose specified, and a relatively stationary carrier on which the said third gear is movably mounted.

2. In a reversible transmission-gear the combination of two elements to be driven the one from the other, a clutch for connecting the two, a gear fast on each of said members, a third gear movable into and out of mesh with the two gears first named, means extending directly through the transmission-gear alternately actuating the clutch and said third gear, for the purpose specified, and a relatively stationary carrier in which the said third gear is movably mounted.

3. The combination of two elements to be driven the one from the other, a clutch for connecting the two, a gear fast on each of said members, a third gear movable into and out of mesh with the two gears first named, means alternately actuating the clutch and said third gear, for the purpose specified, a relatively stationary carrier in which the said third gear is movably mounted, and a spring pressing the third gear yieldingly into one position, the said means for actuating the third gear working against the spring.

4. The combination of two elements to be driven the one from the other, a clutch for connecting the two, a gear fast on each of said members, a third gear movable into and out of mesh with the two gears first named, means alternately actuating the clutch and said third gear, for the purpose specified, a relatively stationary carrier in which the said third gear is movably mounted, and a spring pressing the third gear yieldingly into one position, the said means for actuating the third gear working against the spring, and including a taper collar engaged with the said third gear.

5. The combination of a shaft, a sleeve fast thereon, a pulley loose on the sleeve, a gear fast on the sleeve, a gear fast on the pulley, a third gear movable into and out of mesh with the two gears first named, a clutch for connecting the pulley and shaft, a means alternately acting on the clutch and said third gear, for the purpose specified, and a relatively stationary carrier on which the third gear is movably mounted.

6. The combination of a shaft, a sleeve fast thereon, a pulley loose on the sleeve, a gear fast on the sleeve, a gear fast on the pulley, a third gear movable into and out of mesh with the two gears first named, a clutch for connecting the pulley and shaft, a means alternately acting on the clutch and said third gear, for the purpose specified, a relatively stationary carrier on which the third gear is movably mounted, and a spring pressing the third gear into one direction, the said means acting on the third gear working contrary to the spring.

7. The combination of a shaft, a sleeve fast thereon, a pulley loose on the sleeve, a gear fast on the sleeve, a gear fast on the pulley, a third gear movable into and out of mesh with the two gears first named, a clutch for connecting the pulley and shaft, a means alternately acting on the clutch and said third gear, for the purpose specified, a relatively stationary carrier on which the third gear is movably mounted, said carrier being loosely sustained from the shaft, and an arm projecting from the carrier to engage a relatively stationary part and prevent rotation of the carrier.

8. The combination of a shaft, a sleeve fast thereon, a gear fast on the sleeve, a pulley loose on the sleeve, a gear fast on the pulley, a relatively stationary carrier loosely mounted on the sleeve and pulley, a gear movably mounted on the carrier and meshable with the two gears first named, a spring pressing the third gear into action, a taper collar engaged with the third gear to throw it out of action, a clutch for connecting the pulley and shaft, a means for operating the clutch, and a connection between said means and the taper collar.

9. In a reversible transmission-gear, the combination with a driving and driven element, of a clutch for connecting the two, a set of gears for connecting said driving and driven elements reversely with respect to the clutch, and a connection extending directly through the said transmission-gear, and joining said clutch and set of gears alternately to actuate the clutch and gears.

10. The combination of a shaft, a pulley arranged to turn around the center thereof, a clutch coacting with the shaft and pulley to connect them together, a set of gears for connecting the shaft and gears reversely with respect to the clutch, and a connection between the gears and clutch alternately to actuate them, said connection passing through the hub of the pulley.

11. The combination of a shaft, a sleeve fast thereon, a gear fast on the sleeve, a pulley loose on the sleeve, a gear fast on the pulley, a relatively stationary carrier mounted on the sleeve and pulley, a gear movably mounted on the carrier and engageable with the two gears first named, a means normally pressing the third gear into action, a tapered collar engaged with the third gear to throw it out of action, a clutch for connecting the pulley and shaft, and a connection between the clutch and the tapered collar, said connection including a projected part fitting in a relatively enlarged interior groove in the collar, whereby said projected part may move idly in the groove or engage opposite walls thereof, for the purpose specified.

12. In a reversible transmission-gear, the combination with the driving and driven elements, of a clutch for connecting the two, a set of gears for connecting said driving and driven elements reversely with respect to the clutch, an actuating member for the set of gears, said member having a relatively large cavity and a connection between the clutch and said actuating member, said connection having a part playing loosely in the cavity of the actuating member to allow a certain idle movement between the two, for the purpose specified.

13. In a reversible transmission-gear, the combination with a driving and driven element, of a clutch for directly connecting the two, a gear connected with the driving element, a gear connected with the driven element, an intermediate gear engageable with the two gears first named, a non-rotatable carrier for the intermediate gear, and a connection between the clutch and said intermediate gear, for the purpose set forth, said connection extending directly through the transmission-gear.

In testimony whereof I have signed my name to this specification in the presence of two subscribing witnesses.

JOHNATHAN A. DICKEY.

Witnesses:
HARRY A. BEMPIEL,
NATHANIEL G. MOORE.